(12) United States Patent
Wang et al.

(10) Patent No.: US 12,549,461 B2
(45) Date of Patent: Feb. 10, 2026

(54) METHOD AND APPARATUS FOR REAL-TIME QoS MONITORING AND PREDICTION

(71) Applicant: InterDigital Patent Holdings, Inc., Wilmington, DE (US)

(72) Inventors: Guanzhou Wang, Brossard (CA); Ulises Olvera-Hernandez, Saint-Lazare (CA); Zhibi Wang, Woodridge, IL (US); Morteza Kheirkhah, London (GB); Alec Brusilovsky, Downingtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/725,221

(22) PCT Filed: Jan. 18, 2023

(86) PCT No.: PCT/US2023/011017
§ 371 (c)(1),
(2) Date: Jun. 28, 2024

(87) PCT Pub. No.: WO2023/146777
PCT Pub. Date: Aug. 3, 2023

(65) Prior Publication Data
US 2025/0071034 A1    Feb. 27, 2025

Related U.S. Application Data

(60) Provisional application No. 63/303,572, filed on Jan. 27, 2022.

(51) Int. Cl.
*G06F 15/173* (2006.01)
*H04L 41/16* (2022.01)
*H04L 43/08* (2022.01)

(52) U.S. Cl.
CPC .............. *H04L 43/08* (2013.01); *H04L 41/16* (2013.01)

(58) Field of Classification Search
None
See application file for complete search history.

(56) References Cited

U.S. PATENT DOCUMENTS 12,255,785 B2 *   3/2025   Xin ....................... H04W 8/00
2021/0112458 A1   4/2021   Qiao et al.
(Continued)

FOREIGN PATENT DOCUMENTS

WO    WO 2021244730 A1    12/2021

OTHER PUBLICATIONS

"3rd Generation Partnership Project; Technical Specification Group Services and System Aspects; System architecture for the 5G System (5GS); Stage 2, (Release 17)", 3GPP TS 23.501 V17.3.0 , Dec. 2021, 559 pages.
(Continued)

*Primary Examiner* — Phuoc H Nguyen
(74) *Attorney, Agent, or Firm* — VOLPE KOENIG

(57) ABSTRACT

Procedures, methods, architectures, apparatuses, systems, devices, and computer program products directed to real-time quality of service (QOS) monitoring and prediction are described. A first QoS monitoring request indicating one or more WTRUs may be received from a server. A second QoS monitoring request may be sent, the second QoS monitoring request indicating a session to be monitored by a WTRU of the one or more WTRUS. A QOS monitoring response may be received, the QoS monitoring response indicating (i) the session to be monitored and (ii) performance measurement information associated with the session to be monitored. First performance measurement assistance information may be sent, based on the performance measurement information
(Continued)

associated with the session to be monitored, and QoS report information may be received, the QoS report information indicating one or more Qos metrics measured by the WTRU in the session.

18 Claims, 9 Drawing Sheets

(56) References Cited

U.S. PATENT DOCUMENTS

| | | | |
|---|---|---|---|
| 2022/0182861 A1* | 6/2022 | Youn | H04W 24/08 |
| 2023/0039791 A1* | 2/2023 | Paladugu | H04W 80/10 |
| 2024/0340983 A1* | 10/2024 | Chae | H04W 76/12 |
| 2025/0280071 A1* | 9/2025 | Youn | H04W 76/16 |

OTHER PUBLICATIONS

"3rd Generation Partnership Project; Technical Specification Group Services and System Aspects; Procedures for the 5G System (5GS); Stage 2 (Release 17)", 3GPP TS 23.502 V17.3.0, Dec. 2021, 727 pages.

"3rd Generation Partnership Project; Technical Specification Group Core Network and Terminals; 5G System; Access Traffic Steering, Switching and Splitting (ATSSS); Stage 3 (Release 17)", 3GPP TS 24.193 V17.3.0, Dec. 2021, 75 pages.

"3rd Generation Partnership Project, Technical Specification Group Services and System Aspects; Management and orchestration; Provisioning; (Release 17)", 3GPP TS 28.531 V17.2.0, Dec. 2021, 71 pages.

* cited by examiner

METHOD AND APPARATUS FOR REAL-TIME QoS MONITORING AND PREDICTION

CROSS-REFERENCE TO RELATED APPLICATIONS

This application is a U.S. National Stage Application under 35 U.S.C. § 371 of International Patent Application No. PCT/US2023/011017, filed Jan. 18, 2023, which claims the benefit of U.S. Patent Application No. 63/303,572, filed Jan. 27, 2022, which is incorporated herein by reference in its entirety.

TECHNICAL FIELD

The present disclosure is generally directed to the fields of communications, software and encoding, including, for example, methods, architectures, apparatuses, and systems directed to real-time quality of service (QOS) monitoring and prediction.

BACKGROUND

Federated learning (FL) may be seen as a method to perform distributed machine learning tasks among wireless transmit/receive units (WTRUs) which may have access to local data that may be suitable for learning models. For example, the WTRU may compute update(s) to a global model using local training data and may transmit the updates to a central server over a wireless network. Embodiments described herein have been designed with the foregoing in mind.

BRIEF SUMMARY

Methods, architectures, apparatuses, and systems directed to real-time QoS monitoring and prediction are described herein. In an embodiment, a method may be implemented in a network element. The method may include receiving a first QoS monitoring request from a server. The first QoS monitoring request may indicate one or more WTRUs. The method may further include sending a second QoS monitoring request to a first network element. The second QoS monitoring request may indicate a session to be monitored by a WTRU of the one or more WTRUs. The method may further include receiving a QoS monitoring response from the first network element. The QoS monitoring response may indicate (i) the session to be monitored and (ii) performance measurement information associated with the session to be monitored. The method may further include sending first performance measurement assistance information based on the performance measurement information associated with the session to be monitored, and receiving QoS report information from the first network element, the QoS report information indicating one or more QoS metrics measured by the WTRU in the session. In an embodiment, an apparatus including any of a transmitter, a receiver, a processor, and a memory, may be configured to carry out the method described herein.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref.") in the FIGS. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
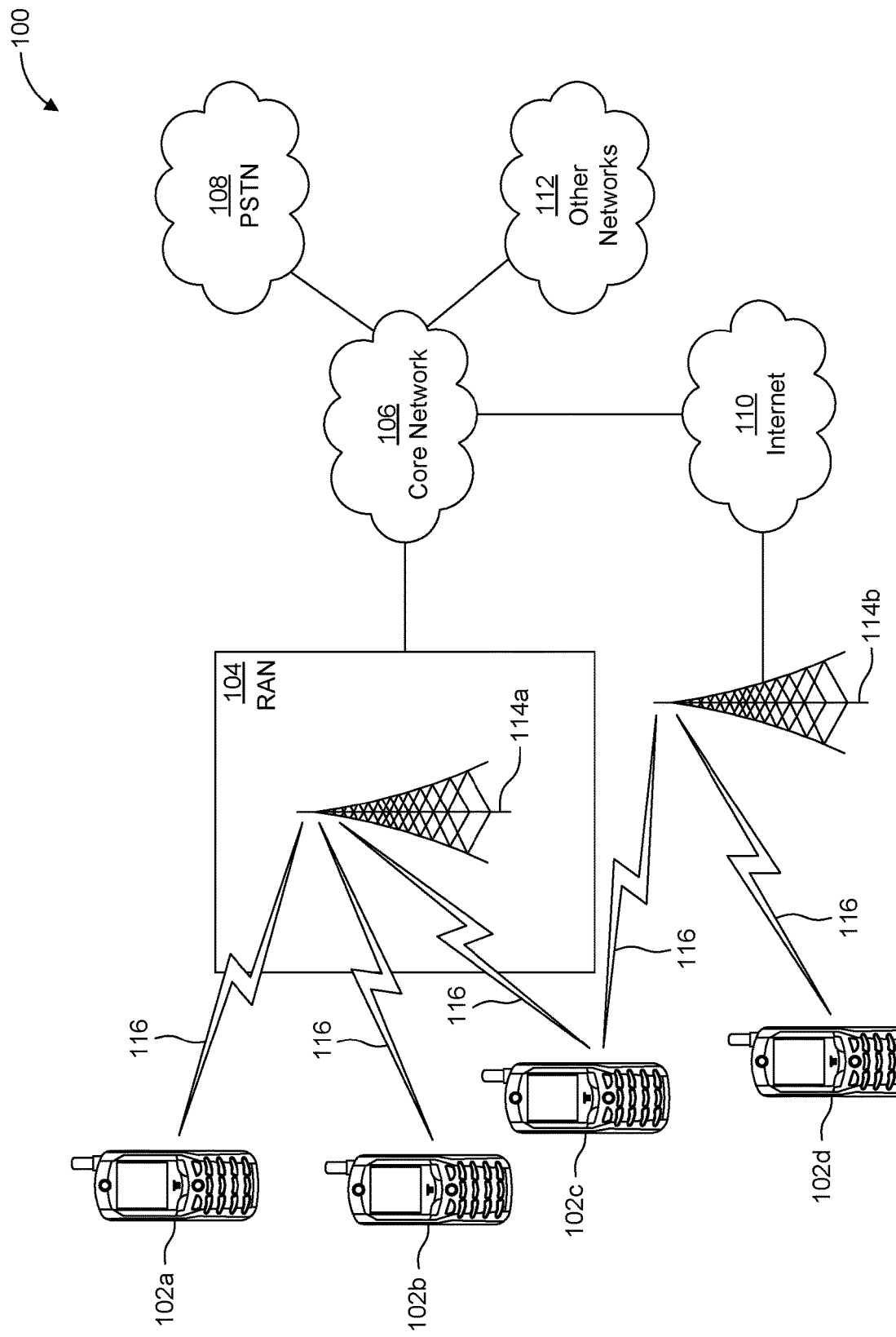
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
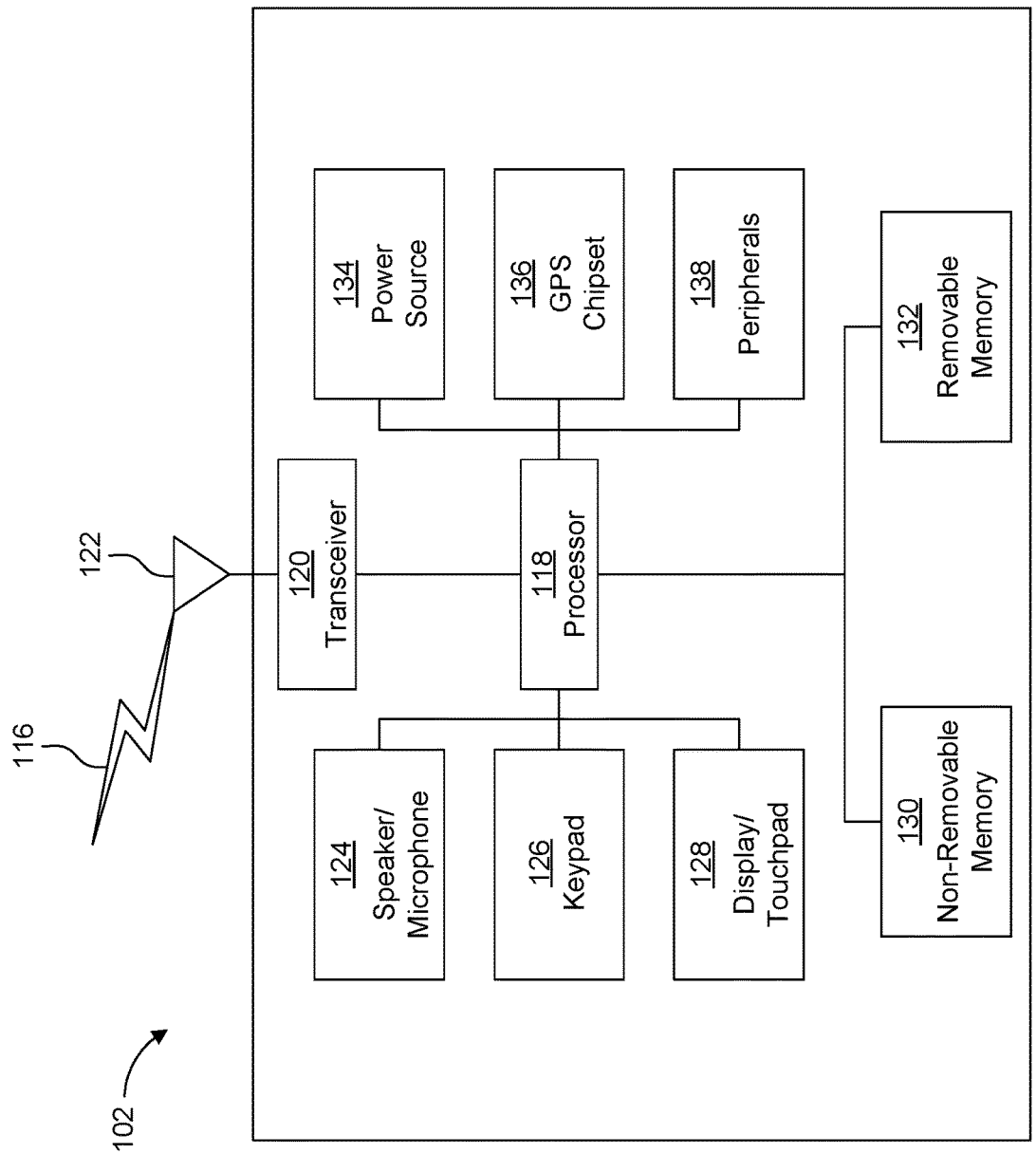
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
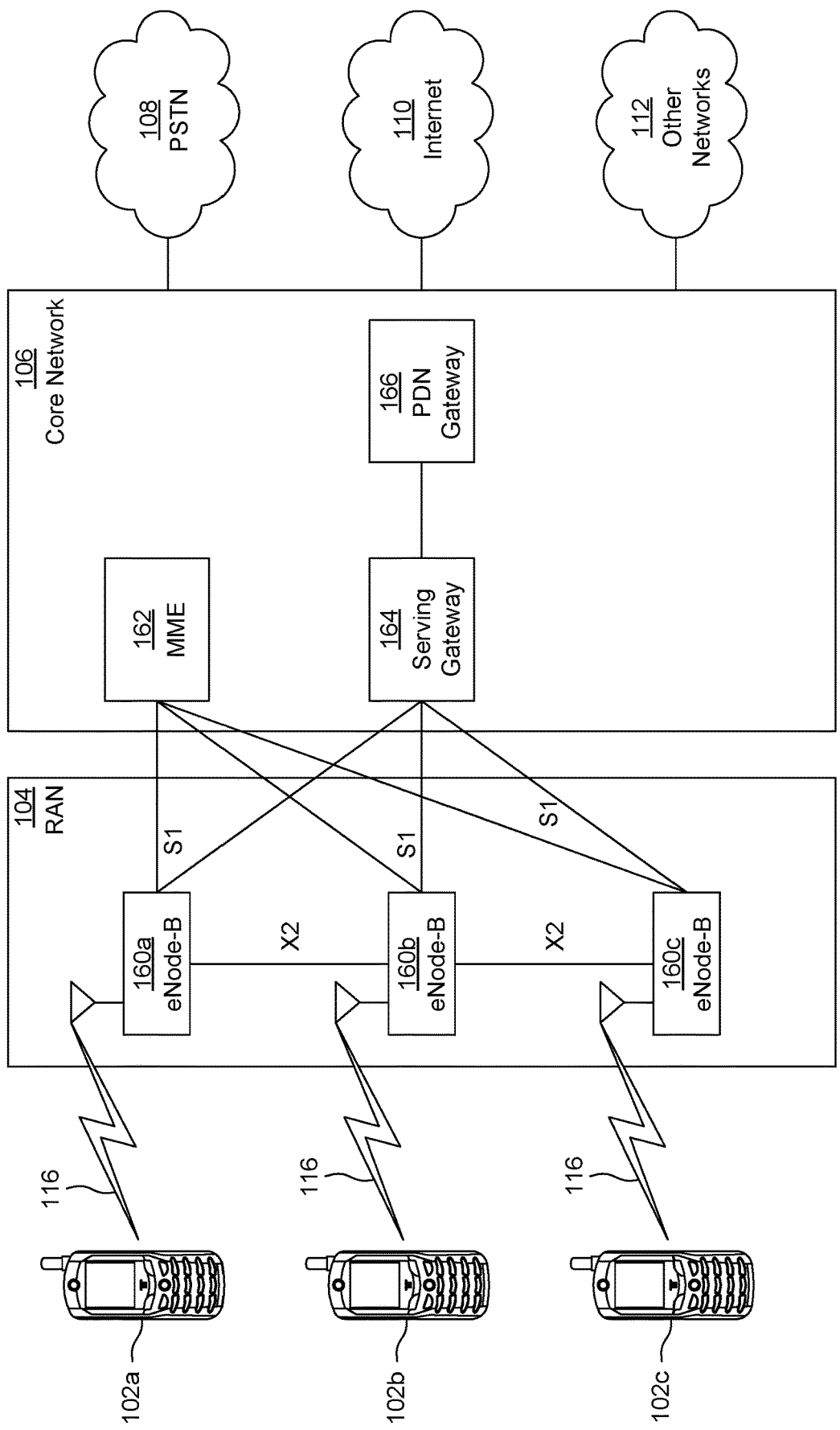
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the SI interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHZ, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
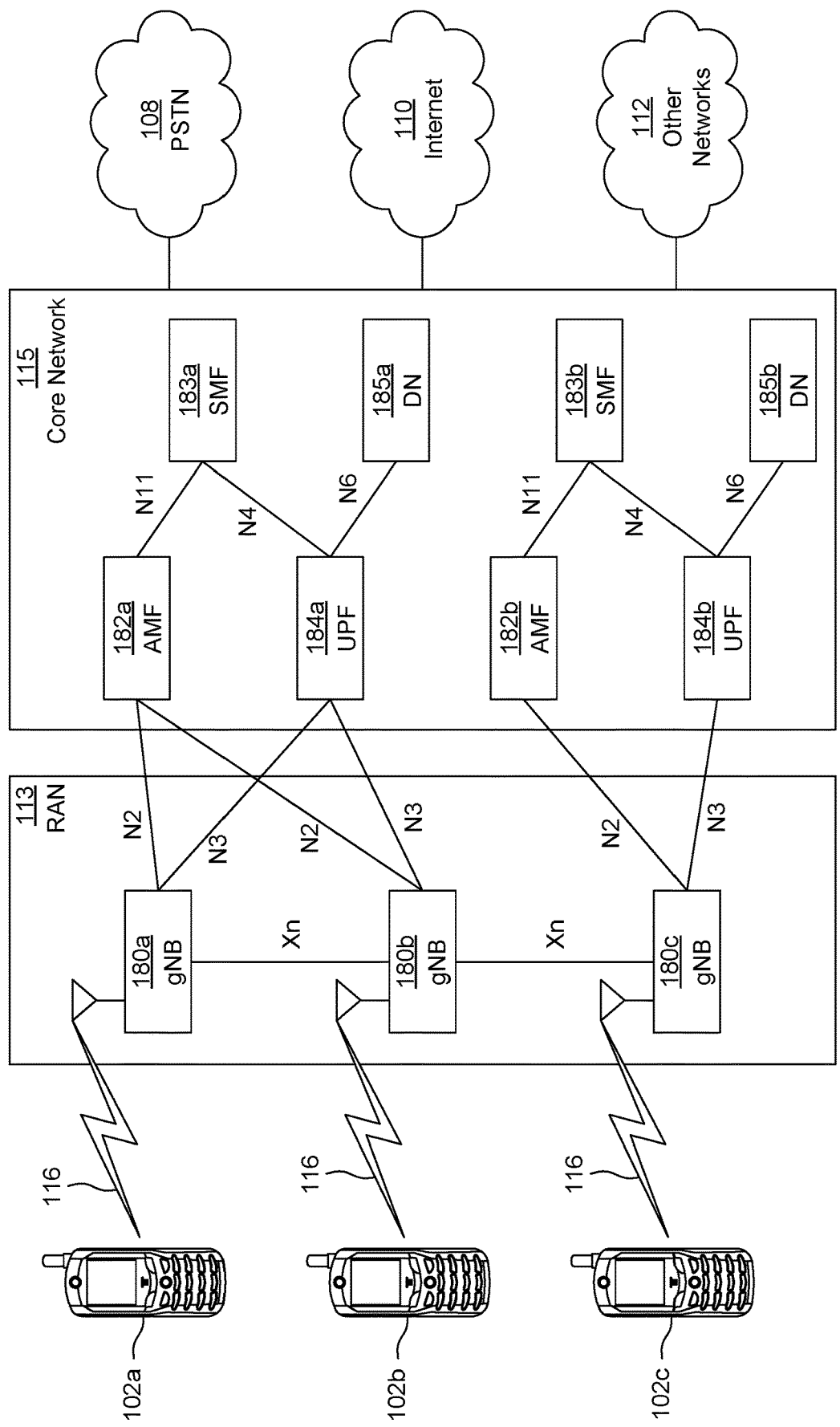
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example of Federated Learning in Wireless Networks

Federated learning (FL) may be referred to herein as method to perform distributed machine learning tasks among WTRUs which may have access to (e.g., a wealth of) local data that may be suitable for learning models. For example, the WTRU may determine (e.g., compute) the update(s) to the (e.g., current global) model using local training data. For example, the WTRU may send back (e.g., transmit) information indicating the determined update(s) to the (e.g., current global) model over the wireless network to e.g., a central server, where the determined update(s) may be aggregated to produce a new global (e.g., updated) model. The new global (e.g., updated) model may be, for example, fed (e.g., transmitted) back to the participating WTRU(s) in order for them to determine (e.g., compute) further (e.g., new) update(s). For example, this process may be iterated until a global model satisfying a criterion may be determined. For example, the user's local data may not be shared with the (e.g., central) server, allowing to avoid privacy and security issues related to data sharing.

With FL, the WTRUs and the (e.g., central) server may exchange, for example, one or more rounds of model data which may be of a e.g., large size. For example, for some learning algorithms, the updates to the global model may represent (e.g., create) large size data. The transmission of a large volume of data over the wireless network may represent (e.g., be associated with) any of a significant network resource consumption and a significant WTRU energy consumption. For example, the performance of FL may be impacted by at least two factors. First, the model converging speed may be determined by the transmission delay between the WTRUs and the (e.g., central) server. This delay may include, for example, the local training time in the WTRUs and the wireless transmission delay. Second, any of a data loss and error(s) introduced by the wireless transmission may impact the accuracy (e.g., level) of the global model. For example, the QoS performance of participating WTRUs in the wireless network may impact the performance of the FL method.

Example of QOS Measuring Mechanism in 5G Networks 5G networks, for example, may provide QoS measuring and monitoring mechanisms.

For example, for access traffic steering switching and splitting (ATSSS), a performance measurement function (PMF), as described in 5.32.5 of 3GPP TS 23.501, "System Architecture for the 5G System", V17.3.0, may be used for access network performance measurement. For example, the access network performance measurement may be configured for a multi-access PDU session. For example, the WTRU and a network element hosting (e.g., executing) the PMF (e.g., in a UPF) may exchange (e.g., any of transmit and receive) PMF messages e.g., over the user plane to measure QoS metrics, such as e.g., any of round-trip time and a packet loss rate, for example, based on the PMF protocol described in 3GPP TS 24.193, "Access Traffic Steering, Switching and Splitting (ATSSS); Stage 3", V17.3.0.

For example, for ultra-reliable low latency communication (URLLC) services, the packet delay may be monitored. The monitored packet delay may include any of the delay between the WTRU and the RAN and the delay between the RAN and the network element hosting (e.g., executing) the PDU session anchor (PSA), e.g., in a UPF. For example, information indicating the RAN part of the delay may be transmitted (e.g., reported) by the (e.g., next generation) RAN, and the other part of delay may be measured by the PSA by any of sending and receiving QoS monitoring packet(s) between the PSA and the NG-RAN, for example based a QoS monitoring for URLLC as described in section 5.33.3 of 3GPP TS 23.501, "System Architecture for the 5G System", V17.3.0.

According to example embodiments described herein, the term "the network" may be used to refer to any network element located in the network, that may be executing any function related to the network (such as e.g., any of a BS, an AMF, a SMF, an UPF, etc.) and that may be able to communicate with a WTRU via any kind of protocol.

Embodiments are described herein via using the PMF (e.g., messages, information) for monitoring the QoS in the network. Embodiments described herein may be applicable to any kind of QoS monitoring protocol (e.g., message, information) that may be used to monitor the QoS in a wireless network.

Overview

Applications such as federated learning may represent challenges for wireless networks in terms of QOS monitoring and prediction. For example, in federated learning, the participating WTRUs may be able to any of transmit and receive (e.g., large amount of) data such as e.g., model updates, with low data error and low communication delay, to obtain any of high learning accuracy and fast convergence speed. For example, the application (e.g., platform, network element) may be able to any of (i) select the participating WTRUs that may be satisfying QoS condition(s) and (ii) make adjustments dynamically, e.g., by removing some (e.g., under-performing) WTRU(s) from a training session, based on, for example, real-time QoS monitoring information. Embodiments described herein may allow to improve the (e.g., 4G/5G) wireless network by enabling the wireless network to measure and provide real-time QoS monitoring information to the external application (e.g., platform, network element). For example, embodiments described herein may allow to provide prediction of a performance change for the WTRU(s).

Embodiments described herein may allow to enable the (e.g., 5G) wireless network to support real-time QoS monitoring and reporting for applications such as federated learning.

Embodiments described herein may allow the (e.g., 5G) wireless network to support real-time QoS prediction for applications such as federated learning.

Embodiments described herein may allow to enhance the application influence on (e.g., 5G) QoS management.

For example, upon a request of the external system, the (e.g., 5G) network may initiate a QoS test session among selected WTRU(s) to obtain QoS evaluation and prediction information. The PMF procedure may be used to support the QoS test session.

For example, upon a request of the external system, the (e.g., 5G) network may measure the real-time QoS performance of the WTRU(s). The PMF procedure may be used to support the QoS performance monitoring.

Embodiments are described herein with the use of any artificial intelligence (AI) and machine learning (ML) applications, which may be referred to herein as any of AI/ML and AIML. Embodiments described herein are not limited to an AI/ML application and may be applicable to other kinds of applications that may use similar QoS monitoring and prediction functionality from the network.

The terms "training session" and "AI/ML training session" may be used interchangeably to designate a session used for training (e.g., obtaining) an AI/ML data model. Embodiments described herein are not limited to AI/ML training sessions and are also applicable to any kind of AIML session (e.g., carrying AIML traffic), e.g., for the purpose of using an AI/ML data model beyond the training of that AI/ML data model.

In certain embodiments described herein, the QoS may be monitored (e.g., evaluated) on one or more PDU sessions between a WTRU and a network element that may be running AIML algorithms. The PDU session may be, for example, a single access PDU session. Embodiments described herein are not limited to (e.g., single access) PDU sessions and may be applicable to any kind of session between a WTRU and a network element, wherein the QoS may be measured by any of the WTRU and the network element.

Example of AIML-Serving Network Function in the Wireless Network

Figure 2:
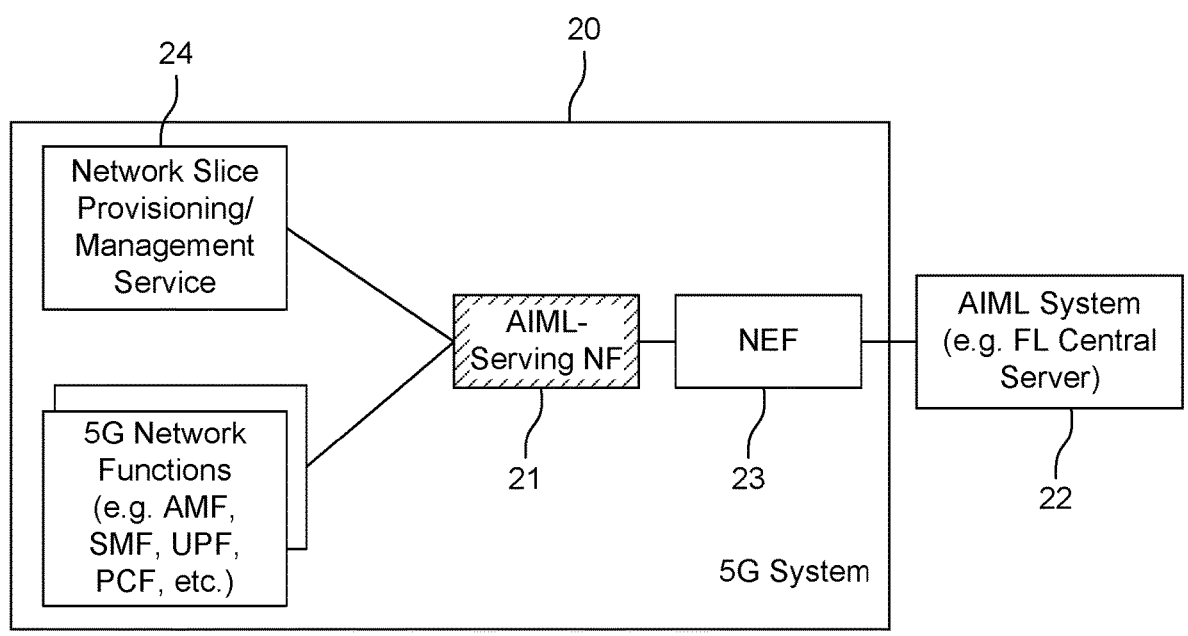
FIG. 2 is a diagram illustrating an example of a network architecture including an artificial intelligence machine learning (AIML) serving network function (NF)

FIG. 2 is a diagram illustrating an example of a network architecture including an AIML-serving network function (NF). The AIML-serving NF 21 may be, for example, located (e.g., executing on a network element located) in the 5G core network 20. The AIML-serving NF 21 may, for example, handle (e.g., perform, process) various interactions with an external AIML system 22, such as e.g., a FL (e.g., central) server. The AIML-serving NF 21 may be a stand-alone NF and communicate with any of the external service platform and external application platform via the NEF 23, as illustrated in FIG. 2. In another example (not illustrated), the AIML-serving NF 21 may be co-located with (e.g., executing in a same network element as) some other network function such as a network data analytics function (NWDAF). In yet another example (not illustrated), the AIML-serving NF 21 may be part of the NEF 23 that may be adapted to process AIML related tasks.

For the sake of clarity, throughout embodiments described herein, the expression "AIML-serving NF" may be used to refer to a "network element executing AIML-Serving NF". More generally, any "network function" may be used to refer to the network element executing (e.g., running, performing, operating) that network function.

The AIML-serving NF 21 may perform a function according to any of the following examples:

In a first example, the AIML-serving NF 21 may handle (e.g., receive and process) the requests from the AIML system 22, such as e.g., a request to start a training session. For example, the AIML-serving NF 21 may coordinate with other network functions to carry out the request(s).

In a second example, the AIML-serving NF 21 may perform network resource management based on the AIML system 22 request, e.g., coordinate with the network slice management service 24 to any of create and decommission a network slice instance for the AIML task.

In a third example, the AIML-serving NF 21 may update the policies and configurations in any of the network and WTRU(s) to prepare for the AIML tasks.

In a fourth example, the AIML-serving NF 21 may any of initiate QoS test(s) for the (e.g., potential) participating WTRU(s), collect the test result, analyze the test result, and send information indicating a test report to the AIML system 22 which, for example, may use the test report to select the WTRUs participating in a AIML training session. In another example, the WTRUs may be selected e.g., for participating in the AIML training session, by the AIML-serving NF 21.

Example of PMF-Based QoS Evaluation and Prediction

For example, the network may conduct (e.g., perform) a QoS test among one or more candidate WTRUs, e.g., before a (e.g., real) AIML training session and may send information indicating the test results to the AIML system which may, based on the indicated test results, select the WTRU(s) that may be participating in the (e.g., real) training session.

For example, a QoS test may be performed by sending test traffic which may simulate the characteristics of the AIML session between the one or more candidate WTRUs and the user plane function(s). For example, any of the WTRU(s) and the UPF(s) may measure one or more QoS metrics, such as e.g., any of the communication delay, the packet loss/error rate, etc. For example, any of the WTRU(s) and the UPF(s) may send the results to the AIML-serving function, such that WTRUs may be selected among the candidates WTRUs for participating in the training session. For example, the performance measurement functionality (PMF) protocol may be used between the network function(s) and WTRU(s), to enable the configuration and to carry-out (e.g., perform) the QoS test.

Example of a Request for QoS Evaluation and Prediction

For example, the AIML-serving NF may receive (e.g., information indicating) a request for any of QoS evaluation and prediction from the AI/ML system. In a first example, the AI/ML system may be an external system and may send (e.g., information indicating) the request to the NEF which may authorize the request and may forward it to the AIML-serving NF. In a second example, the AI/ML system may be internal, e.g., within the 5G core network and may (e.g., directly) send (e.g., information indicating) the request to the AIML-serving NF. The request from the AI/ML system may include information indicating any of the following information (e.g., elements):

- The number of the WTRU(s) that may participate in the AI/ML training session(s).
- Any of identifier(s) and group identifier(s) of the WTRU(s) that may participate in the AI/ML training session(s).
- Any of the traffic characteristics and the traffic objectives of the target AI/ML training session, such as e.g., for any of UL and DL, any of data block size(s), bit rate(s), frequency (e.g., periodicity) of the data exchange between the WTRU(s) and the server, etc.

Any of the (e.g., starting) time and the period (e.g., duration from the starting time) of the target training session.

(e.g., expected, requested) QoS evaluation metrics such as any of UL/DL bit rates, UL/DL communication delay, UL/DL data loss, UL/DL data error rate, etc.

In a case where the NEF forwards (e.g., information indicating) the request to the AIML-serving NF, the NEF may translate any of the external WTRU identifier(s) and the external group identifier(s) to (e.g., 3GPP internal) network WTRU identifier(s) and may include the latter in the request sent to the AIML-serving NF.

Example of Preparation for QoS Test in the Network

For example, the AIML-serving NF may receive information indicating the request. The AIML-serving NF may (e.g., analyze the request and) perform a procedure according to any of the following examples to prepare for the QoS test.

In a first example, the AIML-serving NF may, e.g., query the network database, such as any of the unified data management (UDM) and other NFs for retrieving information related to the WTRU(s) indicated in the received request. Examples of such information may include any of the location of the WTRU (such as, e.g., any of a tracking area identifier (TAI), and a cell identifier (ID)), the serving NF (e.g., AMF) identifier, the connection state, the mobility state, etc.

In a second example, the AIML-serving NF may select a number (e.g., one or more) of candidate WTRU(s) (e.g., identifier(s)) from the set of WTRU identifiers indicated in the request, for any of QoS test and evaluation. For example, the AIML-serving NF may select the candidate WTRU(s) (e.g., identifier(s)) based on the WTRU subscription data, which may indicate, for example, whether the user had an agreement with the network operator to participate in a QoS test. In another example, the AIML-serving NF may select the candidate WTRU(s) (e.g., identifier(s)) based on the WTRU connection state, where, for example, the WTRU(s) in idle state may be preferably selected for QoS test. In yet another example, the AIML-serving NF may select the candidate WTRU(s) (e.g., identifier(s)) based on the WTRU mobility state, where, for example, any of stationary WTRU(s) and WTRU(s) in low mobility state may be preferably selected for the QoS test. In yet another example, the AIML-serving NF may select the candidate WTRU(s) (e.g., identifier(s)) to represent (e.g., all the) WTRUs camping (e.g., connected) on the same cell.

In a third example, the AIML-serving NF may analyze the network resource characteristics (e.g., properties) for the future AI/ML sessions based on any of the information indicated in the request. The AIML-serving NF may send information to the NSSF to query the NSSF whether any (e.g., existing) network slice instance may satisfy the network resource characteristics of the future AI/ML sessions. In a case where there is no (e.g., existing) network slice instance that may satisfy the network resource characteristics, the AIML-serving NF may interact with the network slice provisioning/management system to create a new network slice instance for the future AI/ML sessions. For example, the new network slice instance may be used for the QoS test.

In a fourth example, the AIML-serving NF may select one or more UPFs in the network slice as the performance measurement function (PMF) and the AIML-serving NF may send information indicating the selected UPF to the SMFs in the network slice. For example, the SMFs may select the PMF for the PDU sessions that the WTRU(s) may establish for QoS test. For example, a (e.g., dedicated) data network name (DNN) may be used (e.g., any of reserved and configured) by the AIML-serving NF for QoS test. For example, information indicating the (e.g., reserved, configured) DNN may be transmitted (e.g., communicated) to the SMFs. For example, the AIML-serving NF may determine the PMF assistance information and send information indicating the determined PMF assistance information, e.g., together with the corresponding WTRU identifier, to the serving AMFs of the selected candidate WTRU(s) for QoS test. For example, the PMF assistance information may contain the following information (e.g., elements):

any of the DNN and single network slice selection assistance information (S-NSSAI) used for QoS test session, an identifier of the (e.g., QoS test) session, the PMF address (such as e.g., IP address) and ports used for QoS test, any of the data block size(s) and the bit rate(s) of any of the UL and DL test packets.

a frequency (e.g., periodicity) of any of the UL and DL test packet transmission, an indication of one or more QoS measurement metrics such as any of a communication delay, a block loss rate, a block error rate, etc.

a starting time and a (e.g., lasting) period (e.g., duration, time interval from the starting time) of the QoS test session.

In a fourth example, the AIML-serving NF may interact with the policy control function, e.g., PCF, to update the policy of the WTRU(s) for the QoS test session. For example, the user equipment route selection policy (URSP) rule of a WTRU may be updated so that the WTRU may be able to associate the QoS test session with (e.g., proper) PDU session parameters such as, e.g., any of a DNN, a S-NSSAI, etc.

For example, the serving AMF(s) may receive PMF assistance information and the related WTRU identifier(s) from the AIML-Serving NF. For example, the serving AMFs may forward the PMF assistance information to the target WTRU(s) over, for example, non-access stratum (NAS) messages. For example, the serving AMF(s) may initiate a WTRU configuration update procedure to deliver the PMF assistance information to the WTRU(s).

Example of Initiation of the QoS Test

For example, a WTRU may receive PMF assistance information. For example, the WTRU may determine whether to participate in the QoS test session or not at least based on the received PMF assistance information. In another example, the WTRU may determine a time when to start the test session. For example, the WTRU may determine not to participate or to postpone a participation in a QoS test station in any of the following examples: the WTRU battery level may be low, the WTRU may be engaged in a (e.g., more critical) service (e.g., associated with a higher priority criterion), the WTRU may be (e.g., heavily) loaded.

In a case where the WTRU determines to participate in the QoS test session, the WTRU may, for example, initiate the establishment of the PDU session for the QoS test. For example, the PDU session may be a single access PDU session. For example, the WTRU may determine when to send information indicating a request for PDU session establishment according to the starting time of the test indicated in the PMF assistance information. For example, in a case where any of the DNN and the S-NSSAI is indicated in the PMF assistance information, the WTRU may use (e.g., include) any of the indicated DNN and S-NSSAI for the PDU session establishment request. For example, the WTRU may check (e.g., process) the URSP rules to determine these parameters for the PDU session establishment.

For example, the WTRU may include any of the following information in the PDU session establishment request:

An indication indicating that the PDU session may be used for performing a QoS test. The network, e.g., SMF, may use this indication, for example, to select a UPF for the QoS test. In another example, the network may determine when to release the PDU session based on this indication. In a case where any of a (e.g., dedicated) DNN and a S-NSSNAI is used for a QoS test session, any of the DNN, the S-NSSAI, and a combination of them may serve as the indication to indicate that the PDU session may be used for performing a QoS test.

PMF assistance information. The network, e.g., SMF, may use this information, for example to any of (e.g., properly) select and configure the UPF for the QoS test. For example, the network may use this information to determine which QoS metrics may be measured. For example, the PMF assistance information may allow the network to determine any of when to expect the test data packets and when the test may be completed.

For example, the network may confirm any of the PMF address and ports for a QoS test, for example, by including information in PDU session establishment accept message (e.g., indicating any of the PMF address and ports). In a case where any of PMF address and ports indicated in the PDU session establishment accept message is different from those received in the PMF assistance information, the WTRU may use any of the PMF address and port information received from the SMF (e.g., in the PDU session establishment accept message).

For example, after the PDU session for QoS test may have been established, any of the WTRU and the network may e.g., start sending test packets according to the time indicated in the PMF. For example, the WTRU may send a first UL test packet to the network, and as a response, the network may e.g., start sending the DL test packets. In another example, the network may send a first DL test packet to the network, and as a response, the WTRU may e.g., start sending one or more UL test packets. For example, any of the WTRU and the network may form (e.g., determine, create) any of the UL or DL test packets according to the data characteristics indicated in the PMF assistance information. For example, any of the WTRU and the network may send the test packets according to a frequency (e.g., periodicity) indicated in the PMF assistance information. For example, the test packets may include QoS related information, such as, e.g., any of a timestamp and a sequence number which may be used to determine (e.g., calculate, compute) the QoS metrics.

Example of QoS Test Report Collection and Analysis

For example, the QoS test may be completed. For example, the network may collect test report information indicating the test reports from any of the participating WTRU(s) and network element(s). For example, a WTRU that may have participated in the QoS test may send a test report to the SMF, for example, over NAS signaling. For example, the UPF(s) that may have participated in the QoS test may (e.g., also) send a test report to the SMF. In a first example, the WTRU may send the test report to the SMF using NAS message. In a second example, the WTRU may send the test report to the UPF, e.g., using a PMF message over the user plane and the UPF may forward the WTRU test report from the WTRU to the SMF. The test report may include, for example, any of a WTRU identifier, a QoS test session identifier, a WTRU location indication, and one or more QoS metric measurements. For example, the SMF may consolidate (e.g., aggregate) the test report(s) received from the WTRU and the UPF to form (e.g., determine) a single test report that may include any of (e.g., both) UL and DL QOS measurement information. For example, the SMF may send the consolidated (e.g., aggregated) test report to the AIML-serving NF. For example, the AIML-serving NF may receive (e.g., from the SMF) QoS test report information indicating QoS measurement information (such as, e.g., one or more QoS test metrics measured by the WTRU in the test session).

Based on the test reports from one or more WTRUs that may have participated in the QoS test session, the AIML-serving NF may process (e.g., analyze) the test reports and may perform any of (e.g., intelligent) evaluation and prediction of the overall QoS performance. For example, the AIML-serving NF may provide an estimation of (e.g., an average) of any of the UL bit rate, the DL bit rate, and the delay that may be obtained during the real AI/ML training session. In another example, the AIML-serving NF may provide a list of WTRU(s) (e.g., identifier(s)) that may not have a QoS performance satisfying a criterion.

For example, the AIML-serving NF may send any of the (e.g., overall) QoS performance evaluation and prediction to the AI/ML system that may have requested it. For example, the AI/ML system may take actions according to the received information. For example, the AI/ML system may remove the WTRU(s) with QoS performance not satisfying a criterion from participating in future AI/ML training sessions. For example, any of the AI/ML system and the AIML serving NF may select one of more WTRUs that may have participated in the QoS test session, for being included in an AI-ML training session.

Figure 3:
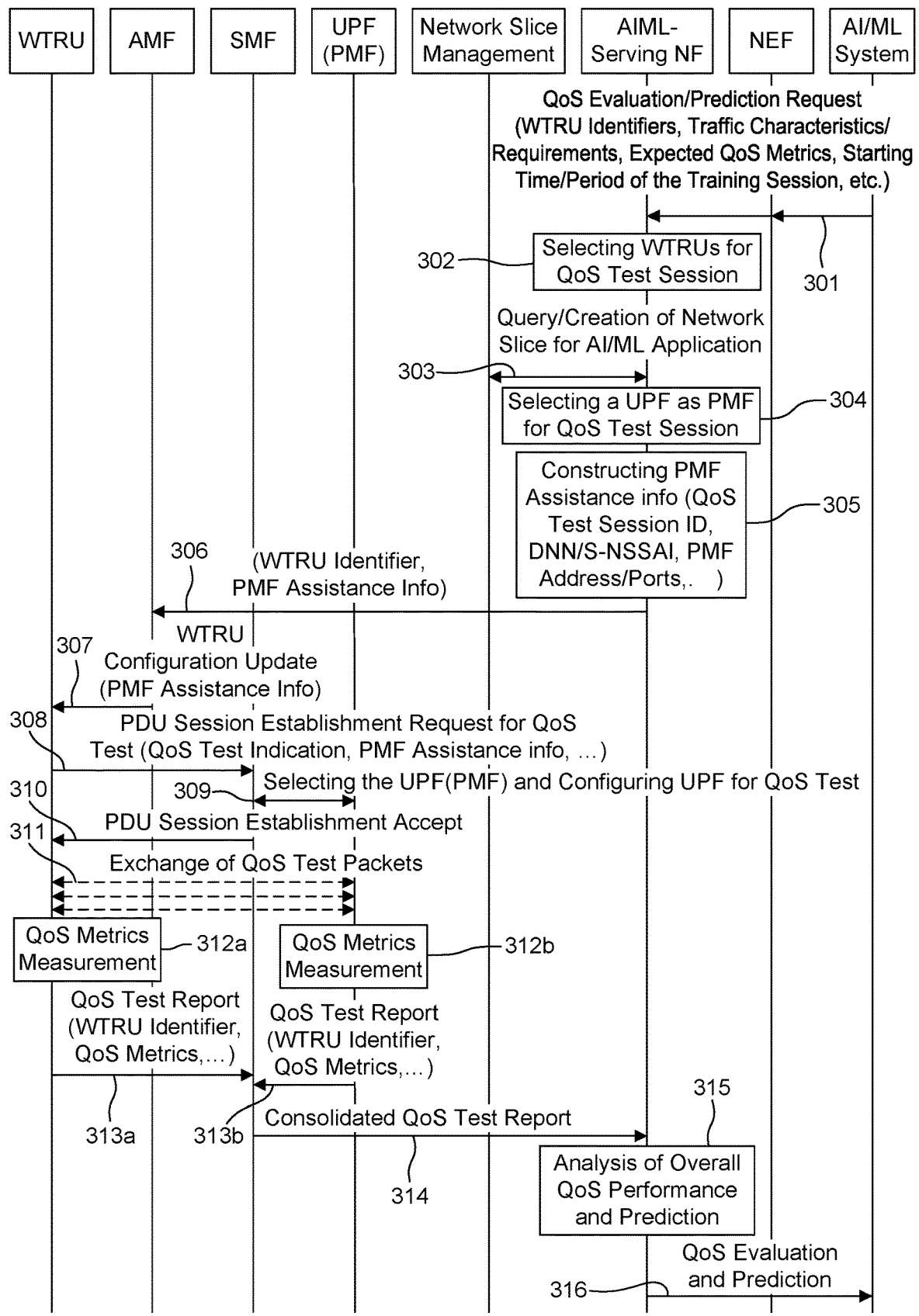
FIG. 3 is a diagram illustrating an example of a QoS evaluation and prediction method.

FIG. 3 is a diagram illustrating an example of a PMF-based QoS evaluation and prediction method.

For example, in step 301, the external AI/ML system may send a message, comprising information indicating e.g., a QoS evaluation (e.g., and prediction) request, to the (e.g., 3GPP) network (e.g., to a NEF). For example, the information may indicate any of (i) one or more WTRU identifiers identifying one or more WTRUs to be included in e.g., a training session, (ii) traffic characteristics, (iii) one or more (e.g., expected, requested) QoS metrics, (iv) a starting time and a period (e.g., duration) of the training session. For example, the NEF may authorize and forward the request (e.g., the message) to the AIML-serving NF in the network.

For example, in step 302, the AIML-serving NF may query (e.g., send a message indicating a query to) other network function(s) for retrieving information regarding the one or more WTRUs, which identifiers may be indicated in the (e.g., information included in the) request, and may further (e.g., down) select one or more WTRUs for a QoS test session based on any of the WTRU's connection state, mobility state, location, etc.

For example, in step 303, the AIML-serving NF may interact (e.g., exchange messages) with the network slice management service/system to determine whether the network slice instance for the AI/ML session is available. The AIML-serving NF may request to dynamically create a new network slice for the AI/ML session.

For example, in step 304, the AIML-serving NF may select a UPF in the network slice as the PMF for QoS test session.

For example, in step 305, the AIML-serving NF may determine (e.g., construct) the PMF assistance information (e.g., element) which may include any of (i) a QoS test session identifier, (such as e.g., any of a DNN and a S-NSSAI) to be used for the test session, (ii) any of PMF address information and PMF ports information, (iii) any of data block size and bit rates of the test packets, (iv) a frequency of the test packet transmission, (v) one or more (e.g., requested) QoS metrics to be measured, (vi) a starting time and period (e.g., duration) of the test session, etc.

For example, in step 306, the AIML-serving NF may send a (e.g., further) message comprising the PMF assistance information to the serving AMF of the one or more WTRUs e.g., to be tested in the QoS test session.

For example, in step 307, the serving AMF may send a (e.g., configuration update) message comprising the PMF assistance information to the WTRU, for example, using (e.g., based on) a WTRU configuration update procedure (e.g., method).

For example, in step 308, the WTRU may initiate PDU session establishment request for QoS test session. For example, the WTRU may send a first message comprising first information indicating a PDU session establishment request for a QoS test session. For example, the first information may include any of a QoS test indication and PMF assistance information.

For example, in step 309, the SMF may select the PMF e.g., as indicated in the PMF assistance information. In another example, the SMF may select another UPF as the PMF.

For example, in step 310, the SMF may send a second message comprising second information indicating a PDU session establishment accept message to the WTRU. The SMF may include (e.g., in the second information) any of the confirmed PMF address information, the confirmed PMF ports(s) information and information indicating the QoS flow to be used for the QoS test.

For example, in step 311, e.g., after the PDU session establishment may have been successful, any of the WTRU and the UPF (PMF) may exchange any of UL and DL test packets.

For example, in step 312a, the WTRU may determine (e.g., calculate) the QoS metrics as indicated (e.g., requested) in the PMF assistance information.

For example, in step 312b, the UPF (PMF) may determine (e.g., calculate) the one or more QoS metrics as indicated (e.g., requested) in the PMF assistance information.

For example, in step 313a, e.g., after the QoS test session may be completed (e.g., over), the WTRU may send a third message to the SMF, the third message comprising third information indicating a QoS test report to the SMF. The QoS test report may include the one or more QoS metrics determined by the WTRU.

For example, in step 313b, e.g., after the QoS test session may be completed (e.g., over), the UPF (PMF) may send a fourth message to the SMF, the fourth message comprising fourth information indicating a QoS test report to the SMF. The QoS test report may include the one or more QoS metrics determined by the UPF (PMF).

For example, in step 314, the SMF may (e.g., consolidate a QoS test report based on the received QoS test reports and) forward the consolidated QoS test report to the AIML-Serving NF. For example, the AIML-Serving NF may receive QoS test report information e.g., from the SMF, the QoS test report information may indicate the one or more QoS test metrics measured by the WTRU in the test session.

For example, in step 315, the AIML-serving NF may perform (e.g., further) analysis of the overall QoS performance based on one or more test reports on QoS test sessions performed by any number of WTRUs.

For example, in step 316, the AIML-serving NF may send a fifth message comprising fifth information indicating the QoS evaluation and prediction result to the external AI/ML system.

Example of a PMF-Based Real-Time QoS Monitoring

For example, the AI/ML system may request (e.g., send information requesting) the network to provide real-time QoS information monitoring for one or more participating WTRU(s) during the AI/ML training session. For example, the network may configure (e.g., send configuration information to) the WTRU(s) and the network function(s) for real-time QoS metrics measuring in a similar way as described in the example of QoS test report collection and analysis, illustrated at FIG. 3, with any of the following differences:

The AIML-serving NF may interact (e.g., exchange messages) with the SMF to configure the UPF (PMF) for QoS monitoring and may retrieve any of PMF address information and PMF port(s) information as part of PMF assistance information. Some additional information, such as e.g., the (e.g., single access) PDU session identifier may be provided in the PMF assistance information. The AIML-serving NF may deliver the PMF assistance information to the WTRU via any of the AMF and the SMF. For example, PMF assistance information may be received by the WTRU from any of the SMF and the AMF.

The QoS measurement may be performed on the (e.g., single access) PDU session for the AI/ML application. For example, the QoS measurement may not be performed on the PDU session (e.g., dedicated) for the QoS test. For example, the QoS metrics can be determined (e.g., calculated) based on (e.g., real) application packets (e.g., data) e.g., instead of test packets (e.g., data). For example, additional information, such as timestamp information, may be inserted in the application packets (e.g., data).

The QoS measurement may be performed on a (e.g., single access) PDU session between a network element (e.g., running AIML algorithms) and a WTRU that may have been preliminary selected among one or more candidate WTRUs using one or more test sessions as illustrated at FIG. 3.

Figure 4:
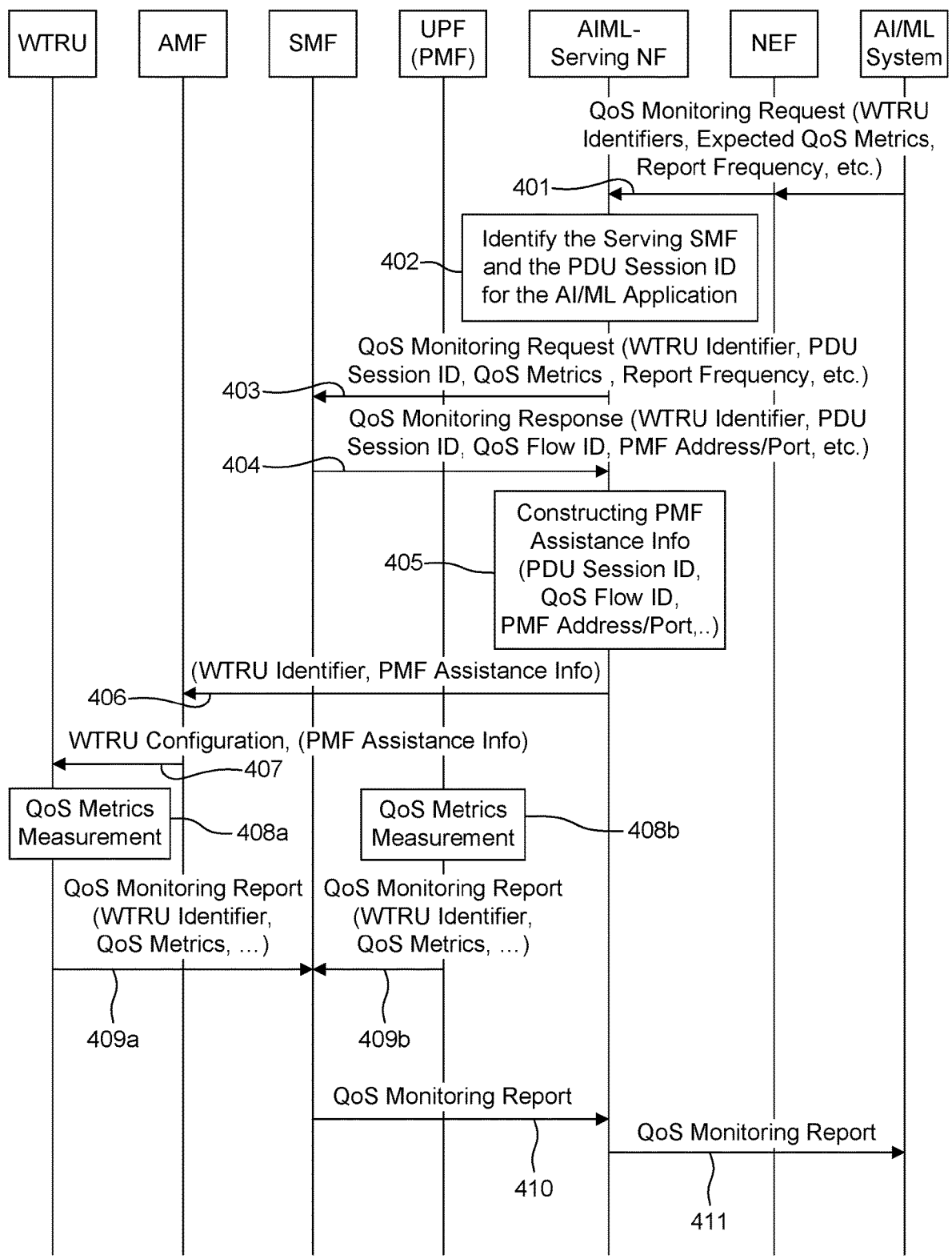
FIG. 4 is a diagram illustrating an example of a real time QoS monitoring method.

FIG. 4 is a diagram illustrating an example of a PMF-based real time QoS monitoring method.

For example, in step 401, the external AI/ML system may send a (e.g., first QoS monitoring request) message comprising information indicating, e.g., a QoS monitoring request to the (e.g., 3GPP) network (e.g., to a NEF). For example, the information may indicate any of (i) one or more WTRU identifiers identifying one or more WTRUs to be included in e.g., a training session, (ii) one or more (e.g., expected, requested) QoS metrics, and (iii) a reporting frequency. For example, the NEF may authorize and forward the request to the AIML-serving NF in the network.

For example, in step 402, the AIML-serving NF may identify any of a first network element (e.g., such as the serving SMF) and the PDU session used for the AI/ML application. For example, the AIML-serving NF may determine (e.g., select) a WTRU of the one or more WTRUs. For example, the first network element may be determined based on the WTRU e.g., as the serving SMF of the WTRU. For example, the AIML-serving NF may receive information indicating any of a serving AMF and a serving SMF of the WTRU e.g., by invoking the Nudm_UECM_Get service.

For example, in step 403, the AIML-serving NF may send a (e.g., second QoS monitoring request) message comprising information indicating a QoS monitoring request to the first network element (e.g., serving SMF). The information included in the (e.g., second QoS monitoring request) message may indicate any of a WTRU identifier, a PDU session identifier of a PDU session to be monitored (e.g., by the WTRU), one or more (e.g., expected, requested) QoS monitoring metrics, a reporting frequency, etc.

For example, in step 404, the first network element (e.g., serving SMF) may (e.g., send configuration information to) configure the UPF (PMF) for QoS monitoring and may send a (e.g., QoS monitoring response) message comprising information indicating a QoS monitoring response to the AIML-serving NF. The UPF (PMF) may run on a second network element running AIML algorithms. The (e.g., QoS monitoring response) message may include information indicating any of the PDU session identifier of the PDU session to be monitored, one or more QoS flow identifiers used by the AI/ML session, information indicating any of a PMF address and ports, etc.

For example, in step 405, the AIML-serving NF may determine (e.g., construct) a PMF assistance information (e.g., element) which may include (e.g., indicate) any of (i) a PDU session identifier, (ii) one or more QoS flow identifiers, (iii) information indicating any of a PMF address and ports, (iv) one or more QoS metrics to be measured, (v) a starting time and a period (e.g., duration) of the monitoring, (vi) a reporting frequency, etc.

For example, in step 406, the AIML-serving NF may send a message comprising the PMF assistance information to a third network element (such as e.g., the serving AMF of the one or more WTRUs) e.g., to be monitored in the PDU session. For example, the third network element may be determined based on the WTRU, such as e.g., the serving AMF of the WTRU.

For example, in step 407, the third network element (e.g., serving AMF) may send (e.g., deliver) a message comprising the PMF assistance information to the WTRU, for example, using (e.g., based on) a WTRU configuration update procedure (e.g., method).

For example, in step 408a, the WTRU may determine (e.g., calculate) the one or more QOS metrics as indicated (e.g., requested) in the PMF assistance information.

For example, in step 408b, the UPF (PMF) may determine (e.g., calculate) the one or more QOS metrics as indicated (e.g., requested) in the PMF assistance information.

For example, in step 409a, the WTRU may send, e.g., in real time, one or more messages comprising QoS monitoring information indicating real-time QoS monitoring report(s) to the first network element (e.g., serving SMF), for example, at the reporting frequency.

For example, in step 409b, the UPF (PMF) may send, e.g., in real time, one or more messages comprising QoS monitoring information indicating real-time QoS monitoring report(s) to the first network element (e.g., serving SMF), for example, at the reporting frequency.

For example, in step 410, the first network element (e.g., serving SMF) may forward (e.g., transmit) any of the received and consolidated QoS monitoring report(s) to the AIML-serving NF, for example, at the reporting frequency.

For example, in step 411, the AIML-serving NF may forward (e.g., transmit) the QoS monitoring report(s) to the external AI/ML system.

For example, the procedure described herein and illustrated by FIG. 4 may be performed in parallel to the procedure illustrated by FIG. 3. For example, while the AI/ML system and the network may be performing the training session and monitoring the QoS performance of the participating WTRU(s), the AI/ML system may request the network to evaluate the QoS performance of other WTRU(s) that may not be participating the current training session.

Figure 5:
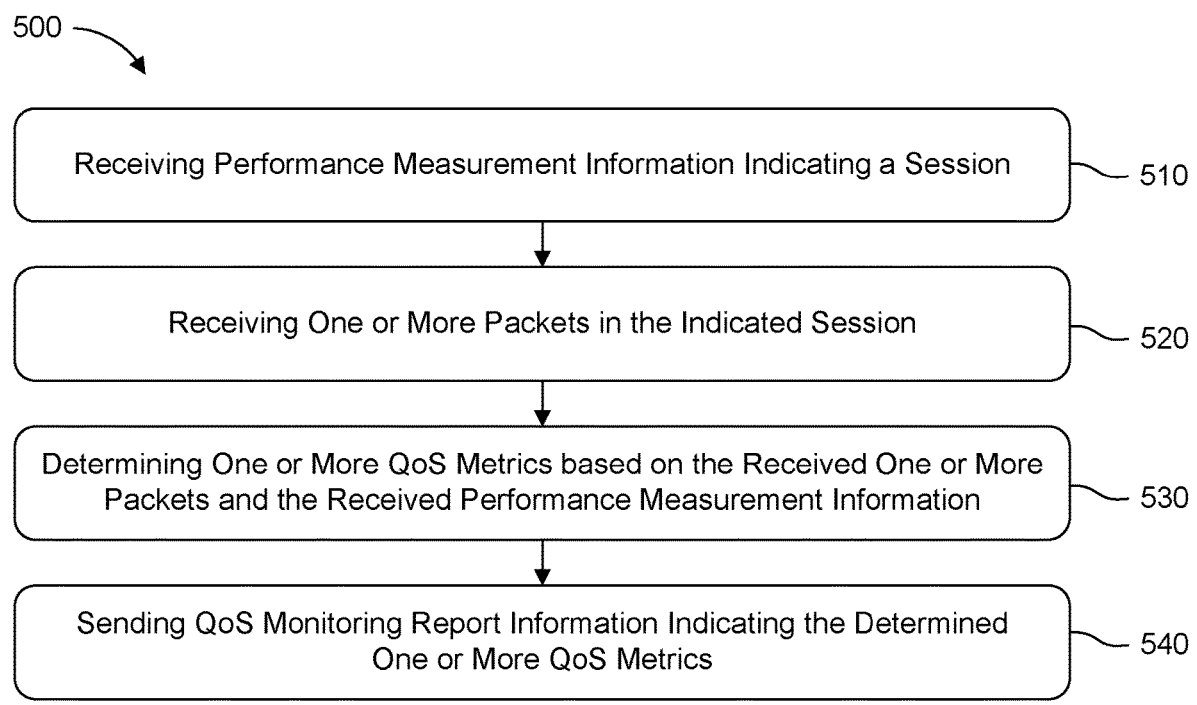
FIG. 5 is a diagram illustrating an example of a method for monitoring the QoS of a session by a WTRU.

FIG. 5 is a diagram illustrating an example of method 500 for monitoring the QoS of a session. For example, the method 500 may be implemented in a WTRU. In step 510, performance measurement information indicating a session may be received. In step 520, one or more packets may be received in the indicated session. In step 530, one or more QoS metrics may be determined based on the received one or more packets and the received performance measurement information. In step 540, QoS monitoring report information indicating the determined one or more QoS metrics may be sent (e.g., to the network).

For example, the performance measurement information may comprise performance measurement assistance information.

For example, the performance measurement information may be received in a configuration update message.

For example, the performance measurement information may indicate any of a performance measurement address and ports.

For example, the performance measurement information may further indicate the one or more QoS metrics to be determined by the WTRU.

For example, the QoS monitoring report information may further indicate an identifier of the WTRU.

For example, the indicated session is a PDU session identified by a PDU session identifier.

For example, the performance measurement information may further indicate one or more QoS flows to be used for determining the one or more QoS metrics.

For example, the received one or more packets may comprise user data.

For example, the indicated session may be a QoS test session.

For example, a request message may be sent by the WTRU, the request message comprising first information indicating a PDU session establishment request for the indicated QoS test session.

For example, the first information may further include any of a QoS test indication and the received performance measurement information.

For example, a response message comprising second information indicating a PDU session establishment accept may be received.

For example, the second information may further indicate one or more QoS flows to be used for determining the one or more QoS metrics.

For example, the second information may further indicate any of a confirmed performance measurement IP address and confirmed ports.

For example, the received one or more packets may comprise test data.

Figure 6:
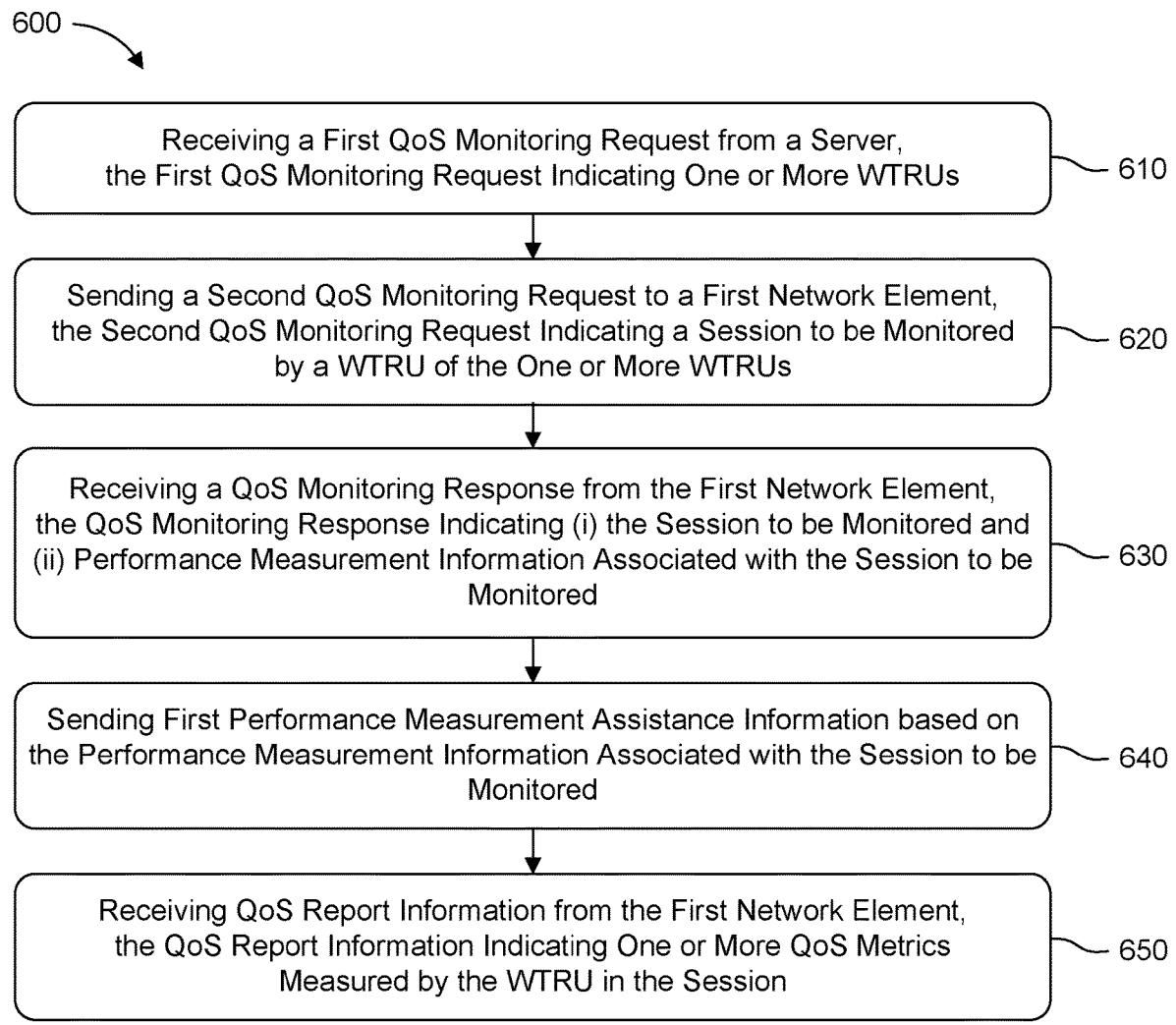
FIG. 6 is a diagram illustrating an example of a method for monitoring the QoS of a session by a network element.

FIG. 6 is a diagram illustrating an example of method 600 for monitoring the QoS of a session by a network element. The method 600 may be, for example, implemented in the network element (which may run an AI/ML-serving NF). In step 610, a first QoS monitoring request may be received from a server. The first QoS monitoring request may indicate one or more WTRUs. The server may be, for example, included in an (e.g., external) AI/ML system. In step 620, a second QoS monitoring request may be sent to a first network element. The second QoS monitoring request may indicate a session to be monitored by a WTRU of the one or more WTRUs. In step 630, a QoS monitoring response may be received from the first network element. The QoS monitoring response may indicate (i) the session to be monitored and (ii) performance measurement information associated with the session to be monitored. In step 640, first performance measurement assistance information may be sent based on the performance measurement information associated with the session to be monitored. In step 650, QoS report information may be received from the first network element. The QoS report information may indicate one or more QoS metrics measured by the WTRU in the session.

For example, the first network element may be determined based on the WTRU.

For example, the session may be between the WTRU and a second network element.

For example, the second network element may run AI-ML algorithms.

For example, the session may carry AI-ML traffic.

For example, the session may be a PDU session.

For example, the first performance measurement assistance information may be sent to a third network element that may be determined based on the WTRU.

For example, the first QoS monitoring request may further indicate any of one or more requested QOS metrics and a reporting frequency.

For example, the second QOS monitoring request may further indicate any of the WTRU, the one or more requested QoS metrics and the reporting frequency.

For example, the performance measurement information associated with the session to be monitored may indicate any of one or more QoS flow identifiers, a performance measurement address and one or more performance measurement ports.

For example, the QoS report information may be received at the reporting frequency.

For example, a QoS evaluation request may be received from the server prior to receiving the first QOS monitoring request, the QoS evaluation request indicating a set of WTRUs including the one or more WTRUs.

For example, second performance measurement assistance information may be sent (e.g., to the third network element) prior to sending the first performance measurement assistance information, the second performance measurement assistance information indicating the WTRU and a test session to be monitored by the WTRU.

For example, the second performance measurement assistance information may further indicate any of one or more requested QoS test metrics, a starting time and a duration of the test session.

For example, QoS test report information may be further received from the first network element, the QoS test report information indicating one or more QoS test metrics measured by the WTRU in the test session.

For example, the WTRU may be selected from the set of WTRUs based on the QoS test report information.

For example, the WTRU may be selected to be included in an AI-ML training session.

For example, the first network element may run an SMF.

For example, the second network element may run a UPF.

For example, the third network element may run an AMF.

In certain embodiments described herein, (e.g., configuration) information may be described as received by a WTRU from the network, for example, through system information or via any kind of protocol message. Although not explicitly mentioned throughout embodiments described herein, the same (e.g., configuration) information may be pre-configured in the WTRU (e.g., via any kind of pre-configuration methods such as e.g., via factory settings), such that this (e.g., configuration) information may be used by the WTRU without being received from the network.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-ID. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

What is claimed is:

1. A method implemented in a network element, the method comprising:
   receiving a QoS monitoring request from a server, the QoS monitoring request indicating a plurality of wireless transmit/receive units (WTRUs);
   sending performance measurement assistance information to a first network element serving the plurality of WTRUs, wherein the performance measurement assistance information indicates an address of a performance measurement function (PMF), and any of (i) a data block size of test packets, (ii) a bitrate of test packets, (iii) a frequency of test packet, (iv) one or more QoS metrics to measure, (v) a starting time, (vi) a duration, (vii) a data network name (DNN) and (vii) a single network slice selection assistance information (S-NSSAI), wherein any of the DNN and the S-NSSAI are to be used for establishing a plurality of QoS test sessions; and
   receiving QoS report information from a second network element, the QoS report information indicating one or more QoS metrics measured by any of the plurality of WTRUs and the PMF in the plurality of QoS test sessions.

2. The method of claim 1, wherein the first network element is determined based on the plurality of WTRUs.

3. The method of claim 1, wherein the plurality of QoS test sessions is between the plurality of WTRUs and a third network element executing the PMF.

4. The method of claim 3, wherein the third network element runs executes artificial intelligence and machine learning (AI-ML) algorithms.

5. The method of claim 3, wherein the third network element executes a user plane function (UPF).

6. The method of claim 1, wherein the plurality of QoS test sessions carries AI-ML traffic.

7. The method of claim 1, wherein the plurality of QoS test sessions is a plurality of protocol data unit (PDU) sessions.

8. The method of claim 1, wherein the QoS monitoring request further indicates any of (i) one or more WTRU identifiers, (ii) traffic characteristics, (iii) one or more QoS metrics to measure, (iv) a starting time and (v) a duration.

9. The method of claim 1, wherein the first-second network element executes a session management function (SMF).

10. The method of claim 1, comprising selecting a subset of WTRUs from the plurality of WTRUs to be included in an AI-ML training session based on the QoS report information.

11. The method of claim 1, wherein the first network element executes an access and mobility management function (AMF).

12. An apparatus comprising a processor and a transceiver operatively coupled to the processor, the processor being configured to:
    receive a QoS monitoring request from a server, the QoS monitoring request indicating a plurality of wireless transmit/receive units (WTRUs);
    send performance measurement assistance information to a first network element serving the plurality of WTRUs, wherein the performance measurement assistance information indicates an address of a performance measurement function (PMF), and any of (i) a data block size of test packets, (ii) a bitrate of test packets, (iii) a frequency of test packet, (iv) one or more QoS metrics to measure, (v) a starting time, (vi) a duration, (vii) a data network name (DNN) and (vii) a single network slice selection assistance information (S-NSSAI), wherein any of the DNN and the S-NSSAI are to be used for establishing a plurality of QoS test sessions; and
    receive QoS report information from a second network element, the QoS report information indicating one or more QoS metrics measured by any of the plurality of WTRUs and the PMF in the plurality of QoS test sessions.

13. The apparatus of claim 12, wherein the plurality of QOS test sessions is between the plurality of WTRUs and a second-third network element executing the PMF.

14. The apparatus of claim 13, wherein the third network element executes artificial intelligence and machine learning (AI-ML) algorithms.

15. The apparatus of claim 12, wherein the QoS monitoring request further indicates any of (i) one or more WTRU identifiers, (ii) traffic characteristics, (iii) one or more QoS metrics to measure, (iv) a starting time and (v) a duration.

16. The apparatus of claim 12, wherein the processor is further configured to select a subset of WTRUs from the plurality of WTRUs to be included in an AI-ML training session based on the QoS report information.

17. The apparatus of claim 12, wherein the first network element executes an access and mobility management function (AMF).

18. The apparatus of claim 12, wherein the second network element executes a session management function (SMF).

* * * * *